UNITED STATES PATENT OFFICE.

FRED B. WELLS, OF HILLYARD, WASHINGTON, ASSIGNOR TO CHARLES DURANT, OF HILLYARD, WASHINGTON.

REMEDY FOR HEMORRHOIDS.

1,385,195.        Specification of Letters Patent.     Patented July 19, 1921.

No Drawing.     Application filed August 13, 1919. Serial No. 317,214.

*To all whom it may concern:*

Be it known that I, FRED B. WELLS, a citizen of the United States, residing at Hillyard, in the county of Spokane and State of Washington, have invented a new and useful Remedy for Hemorrhoids, of which the following is a specification.

This invention relates to an improved remedy for the relief and cure of hemorrhoids.

My improved remedy is in the form of a liquid and has as its base ingredient an element possessing active healing virtues as well as being a powerful astringent, and also an effective antiseptic. This base ingredient is added to a solvent in quantities in excess of that which the solvent can dissolve, the excess being in a state of suspension. Thus, the solvent functions as a carrying agent for such excess as is not dissolved so that when the container is slowly inverted, such excess will be very generally distributed throughout the liquid as in the case of an emulsion. Thus, in application, those particles not dissolved, will retain their approximately full strength.

Specifically speaking, my improved remedy is composed of ox bile and alcohol, preferably denatured alcohol, in equal proportions in volume.

Obtaining the gall bladder of an ox, just killed, I empty the bile into a suitable container. The character and nature of bile is too well known to necessitate a description of its properties and characteristics. I add denatured alcohol in a proportion to equal in volume the volume of bile, the alcohol acting first as a thinner, and also as a solvent for a portion of the bile. However, I find that in these proportions, the alcohol will not dissolve all of the bile. The liquid is thoroughly stirred, a considerable froth resulting, which soon evaporates and disappears after the stirring operation ceases. Thus, it is my theory that bile and alcohol are not immiscible and that to a considerable extent, the bile not only goes into solution but also chemically reacts in and forms with the alcohol a homogeneous liquid. However, the amount of bile used, compared to the amount of alcohol, is in excess of the capacity of the latter as a solvent, and this excess remains in suspension and settles to the bottom of the container after the latter stands for a short period. Of course, the bottle or container is quickly sealed after the mixture is formed to avoid evaporation.

In use, the bile acts as an astringent, in addition to its healing properties, thereby not only removing irritation and inflammation but also contracting the parts subjected to its action which in the case of hemorrhoids, serves to quickly remove the pain and obstruction attending stools.

In application, the bottle containing the remedy is slowly and carefully inverted, end to end, thereby widely dispersing the settled excess into general suspension in and throughout the liquid. A suitable amount of antiseptic cotton is then saturated with the liquid and the cotton is applied to the anus and the protruding parts projecting therefrom, where the hemorrhoids are external. If the trouble is internal, the saturated cotton is inserted into the rectum as far as the finger will permit, the cotton acting as an expander and serving to separate the inflamed parts and freely exuding, under the resultant pressure, the liquid with which the cotton is saturated. Preferably, the cotton will not be bunched but will, as far as possible, be elongated to the more effectively reach all the inflamed area. However, I have found in practice that the alcohol acts so effectively as a carrying agent that even when application is made on, about and upon the anus, the liquid will be drawn upwardly into the rectum. I have cured chronic cases of internal and external hemorrhoids in four days, the treatments being effected from three to four times a day. In the case of bleeding hemorrhoids, a longer time is necessary to effect a cure. It will be informative to state that immediately after an evacuation, my patients have experienced the greatest extent of relief from this treatment, the parts being thoroughly cleansed before applying the liquid.

In no case have I found that the internal or external application of my remedy has acted as a purgative or has in any way tended to initiate a stool.

It is believed that my invention will be clearly understood from the foregoing description, and I do not wish to be limited thereto except for such limitations as the claims may import.

I claim:—

1. A remedy for hemorrhoids composed of animal bile and alcohol in equal parts.

2. A remedy for hemorrhoids composed of ox bile and alcohol in proportions to leave an excess of bile undissolved by the alcohol.

3. A remedy for hemorrhoids, comprising ox bile and alcohol, the proportion of bile present being greater than the proportion which may be dissolved by the alcohol present, the excess bile remaining in suspension in the solution.

In testimony that I claim the foregoing as my own, I hereby affix my signature.

FRED B. WELLS.